Oct. 4, 1966   W. B. McCARDELL   3,276,135
GEAR TOOTH CHECKING SYSTEM
Original Filed May 1, 1961

INVENTOR.
Willard B. McCardell
BY
Harness, Dickey & Pierce
ATTORNEYS.

United States Patent Office 3,276,135
Patented Oct. 4, 1966

3,276,135
GEAR TOOTH CHECKING SYSTEM
Willard B. McCardell, Royal Oak, Mich., assignor to Michigan Tool Company, Detroit, Mich., a corporation of Delaware
Original application May 1, 1961, Ser. No. 106,645, now Patent No. 3,195,239, dated July 20, 1965. Divided and this application Jan. 7, 1965, Ser. No. 440,969
3 Claims. (Cl. 33—179.5)

This case is a division of copending application Serial No. 106,645, filed May 1, 1961 now Patent No. 3,195,239.

This invention relates to gear tooth checking systems, and more particularly to a method for determining the pitch circle eccentricity as well as the tooth spacing errors on straight or helical gears and splines.

The problem of checking the accuracy of gears and splines is complicated by the fact that two types of errors, pitch circle eccentricity or runout, and tooth spacing or index errors between teeth, cannot be separated or differentiated by ordinary checking methods except perhaps by the use of lengthy and complicated mathematical analysis.

It is an object of the present invention to provide a novel and improved gear checking system which will quickly identify tooth errors and will permit the separation of index and eccentricity errors by simple means without the necessity for analysis by a highly trained person.

It is another object to provide an improved checking system of this character which is versatile in nature, may be applied to straight or helical gears and splines, is usable for even or odd numbers of teeth, and requires relatively uncomplicated equipment.

Other objects and advantages of the present invention will become apparent from the following detailed description taken in conjunction with the accompanying drawings.

In general terms, the illustrated embodiment of the invention comprises a checker in which a gear may be mounted between centers, the checker having a pointer carriage with two dial indicators, and a pointer tip engageable with one tooth at a time. One indicator shows the radial distance of the pointer from the checker centerline for each tooth, while the other indicator shows the position of the tooth in a circumferential or angular direction. The later is accomplished by forming the pointer as a pivotable lever which moves the second indicator, the pointer engaging both flanks of each tooth.

A plurality of charts are provided for plotting the indicator readings, each chart having a plurality of plotting areas arranged in a circle, each area representing one tooth and having rectangular coordinates. In plotting the readings on the first of these charts, a fiducial tooth is chosen having approximately zero runout or eccentricity. The readings are plotted in each tooth area on the chart by drawing a tangential line corresponding to the radial indicator reading and a radial line corresponding to the reading of tip pivotal movement.

The chart is then placed on a light table and a second blank chart placed over it so that the zero coordinates of the fiducial tooth areas on the two charts match. The second chart is then swung about this point until the origins of its tooth areas (which are on the gear pitch circle of the second chart) coincide with the pitch circle of the first chart (which is a circle passing through the plotted points). The plotted points of the other teeth on the first chart are then traced onto the second chart, and the center of the first chart is also traced onto the second chart. The spacing between the plotted center and actual center on the second chart will then show the amount of pitch circle eccentricity, while the plotted radial lines on the second chart will show the true tooth spacing or index area of each tooth with respect to the fiducial tooth, with the eccentricity error being removed.

Figure 1:
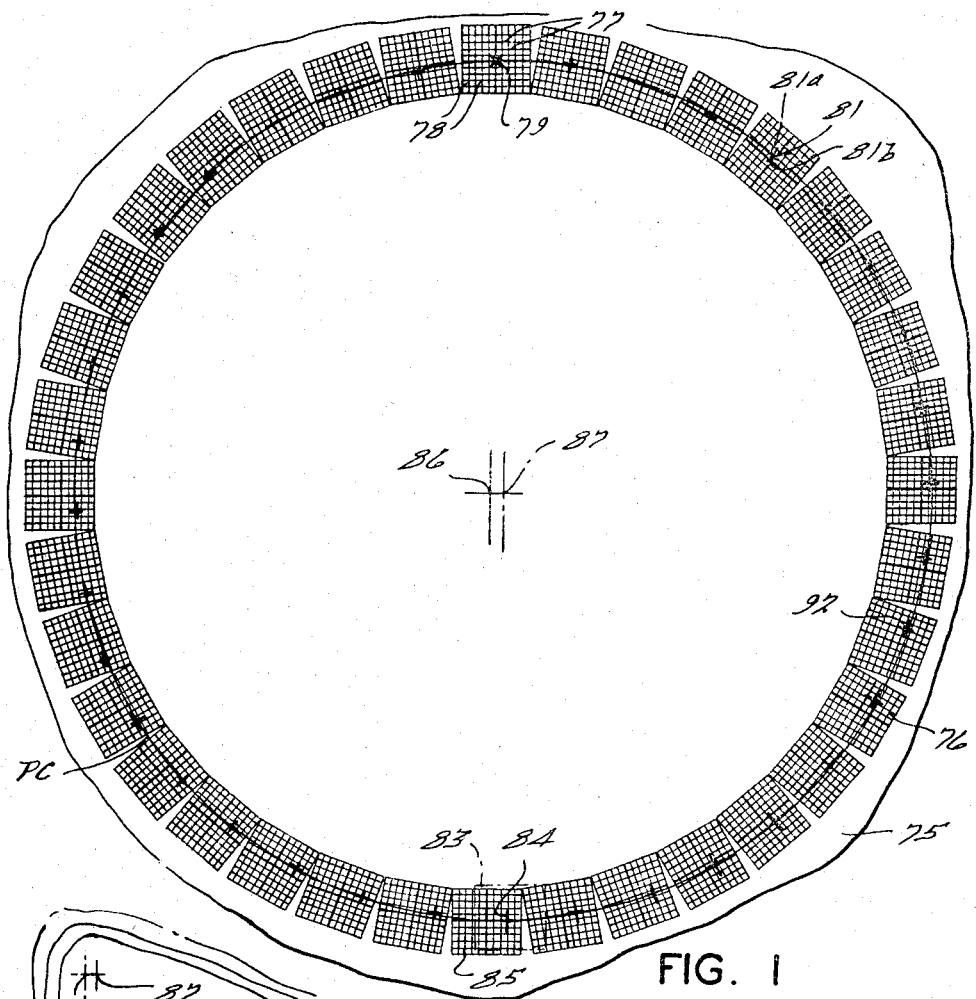
FIGURE 1 shows a chart used to plot the readings taken on the checker.
Figure 2:
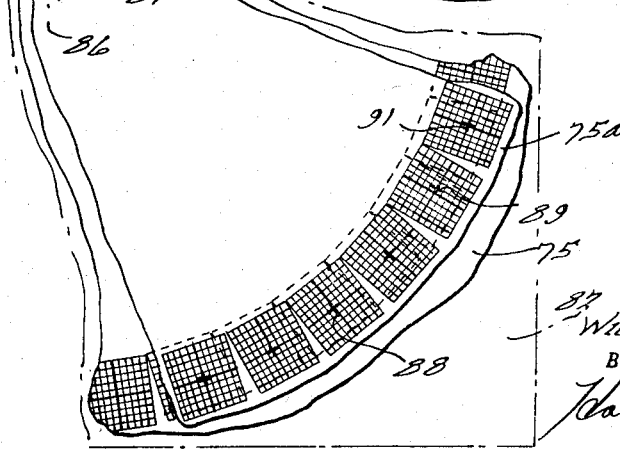
FIGURE 2 shows a portion of a second chart overlying the first chart on a light table in order to plot the pitch circle eccentricity as well as the true tooth spacing or index errors of the individual gear teeth.

In using the checker to obtain data enabling the determination of tooth spacing errors and eccentricity, a plurality of charts 75, 75a are provided as shown in FIGURES 1 and 2. These are identical charts printed on translucent paper and each comprises a circularly arranged group of squares 76, each square having rectangular coordinates with equally spaced tangential lines 77 and equally spaced lines 78 at right angles to lines 77. The central lines of sets 77 and 78 may be made slightly heavier to serve as "0" lines, the intersection of these central lines being the origin of the coordinate system. A number of squares 76 may be provided which is sufficient to enable each square to be used for plotting the data from a single tooth. If the number of teeth on the gear being checked is only a fraction of the number of squares on the chart, appropriately spaced squares may be used on the chart so that the plotted data will be evenly spaced around the circle. Variations in the chart may be provided within the principles of the invention, for example, a plurality of concentric circles, each with a different number of coordinate squares, may be provided on the same chart, with that circle being chosen which suits the particular gear being checked.

In checking a gear, the operator will first make a preliminary inspection of the gear, locating two oppositely disposed teeth which give about the same reading on a first indicator which indicates radial distance from the checker centerline. These two teeth are located at about the points of zero runout or pitch circle eccentricity, and one of the two teeth will be used as a fiducial tooth, that is, as the starting point of the readings.

The operator will engage the fiducial tooth with the pointer tip of a second indicator which indicates tooth position in a direction at right angles to the extent of the tooth, and set both indicators at zero. He will then record a small "X" at the origin of the graph segment 76 at the top of the chart which represents the first or fiducial tooth; this "X" is indicated at 79 in FIGURE 1.

The operator will then withdraw the pointer, index the gear one tooth, and take a reading on the next tooth.

In checking the teeth, the readings on the first indicator will be plotted on lines 77 while the readings on the second indicator will be plotted on lines 78. The number and closeness of the lines may be chosen to suit requirements; the spacing between two adjacent lines may, for example, represent a distance of 0.0002 inch.

If the first indicator shows that a particular tooth is high with respect to the fiducial tooth, such a reading will be plotted on a line 78 spaced further away from the chart axis than the origin. For example, the plotted mark indicated generally at 81 in FIGURE 1 shows this condition, with the line 81a thereof representing a reading on the first indicator which shows that this particular tooth is further away from the checker centerline than the fiducial tooth.

The second indicator will be responsive to slight shifts of its pointer tip about the pointer axis. The data from this indicator may be so plotted that if, for any tooth, the pointer tip must be moved clockwise with respect to its position for the fiducial tooth, the reading will be plotted to the left of the origin if one is observing the graph segment from the graph axis. For example, plot 81 has a line 81b to the left of the origin indicating this condition.

After all the tooth positions have been plotted, a second chart 75a is laid over chart 75, as seen in FIGURE 2, both charts being placed on a light table 82. An "X" is made in the top graph segment (not shown) of chart 75a at the origin thereof, and this "X" is placed over the "X" of chart 75. Chart 75a is then swung about this point until the origins of all the graph segments of chart 75a (which may be considered to be on the pitch circle of chart 75a) are over the gear pitch circle PC on chart 75 (FIGURE 1), which is a circle passing through all the plotted points on chart 75. Note that when this is done, the origin of the lowermost graph segment on chart 75a (indicated by dot-dash lines at 83 in FIGURE 1) will not necessarily be positioned over the plotted point 84 of the lowermost graph segment 85 on chart 75. All the plotted points for the teeth are then traced from chart 75 onto chart 75a, and the location of the center of the original chart is also marked on chart 75a.

The errors in the gear or spline may now be analyzed by studying chart 75a. The distance between center 86 of chart 75 and center 87 of chart 75a will indicate the amount of eccentricity, that is, the distance between the axis of the spline or gear and the axis of its shaft. Thus, it will be known whether machine centers are causing excessive runout and whether repairs are necessary. The direction of this eccentricity will also be observable from the plotted information; in the illustrated example, the gear axis will be to the right of the shaft axis.

The points plotted on graph 75a will all be on zero line 77, as is evident in FIGURE 2, eccentricity errors having been removed by shifting the charts in the manner described above. The resulting locations of the plotted points on chart 75a will show the true tooth spacing error for each tooth. For example, point 88 in FIGURE 2 will show a slight tooth spacing error with respect to the fiducial tooth in one direction, whereas point 89 will show a tooth spacing error in the opposite direction. Note that plotted point 91 on chart 75a, which is taken from point 92 on chart 75, seen in FIGURE 1, will actually have practically no true tooth spacing error, whereas point 92 indicated a substantial apparent tooth spacing error.

An apparatus and method are thus provided which may be carried out in a mechanical manner without the necessity of applying mathetmatical formulae or complicated procedures in order to ascertain true tooth spacing errors and actual gear eccentricity. The charts may be readily preserved as records of the check, occupying a minimum of space, and may be marked to identify the checked gear.

While it will be apparent that the preferred embodiment herein illustrated is well calculated to fufill the objects above stated, it will be appreciated that the invention is susceptible to modification, variation and change without departing from the proper scope or fair meaning of the subjoined claims.

What is claimed is:

1. In a method for checking gear tooth errors, the steps of providing two identical charts each having a plurality of circularly arranged graph segments with rectangular coordinates, each of said graph segments having an origin located centrally of the segment, plotting on a first of said charts differences in tooth locations in both radial and tangential directions, placing the second of said charts over said first chart, displacing said second chart so as to locate the origins of the graph segments on said second chart over a circle passing through the plotted points of said first chart, and transferring the plotted points of said first chart to the graph segments of said second chart.

2. In a method for determining gear tooth errors, the steps of measuring the relative positions of each tooth in both radial and tangential directions, plotting said positions on a first chart having a plurality of circularly arranged graph segments, each of said graph segments having an origin located centrally of the segment, each graph segment having tangential lines for plotting radial tooth positions and lines at right angles to the tangential lines for plotting tangential tooth positions, placing a second chart identical with said first chart over the first chart with the origin of a graph segment of said second chart overlying the plotted point in one of two substantially oppositely disposed graph segments of said first chart with the same radial tooth position, displacing said second chart so as to locate the origins of the graph segments on said second chart over a circle passing through the plotted points of said first chart, tracing the plotted points from the first chart onto the graph segments of the second chart, and tracing the center of the first chart onto the second chart.

3. The method according to claim 2, further provided with the step of initially locating two substantially oppositely disposed teeth on said gear having the same radial position, and choosing one of said teeth as a fiducial tooth plotted at the origin of its graph segment.

References Cited by the Examiner

UNITED STATES PATENTS

| 2,337,545 | 12/1943 | Collins | 33—1 X |
| 2,407,893 | 9/1946 | Meyer | 33—1 |
| 2,485,674 | 10/1949 | Suiter | 33—1 |
| 2,703,454 | 3/1955 | Haywood | 33—1 |

LEONARD FORMAN, *Primary Examiner.*

ROBERT B. HULL, *Examiner.*